US012219311B2

(12) United States Patent
Kim et al.

(10) Patent No.: US 12,219,311 B2
(45) Date of Patent: Feb. 4, 2025

(54) ELECTRONIC DEVICE HAVING PLURALITY OF ACOUSTIC DUCTS

(71) Applicant: SAMSUNG ELECTRONICS CO., LTD., Suwon-si (KR)

(72) Inventors: Jonghwan Kim, Suwon-si (KR); Kiwon Kim, Suwon-si (KR); Sukgyong Kim, Suwon-si (KR); Myeungseon Kim, Suwon-si (KR); Changmin Kim, Suwon-si (KR); Hakhoon Song, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 283 days.

(21) Appl. No.: 17/862,841

(22) Filed: Jul. 12, 2022

(65) Prior Publication Data

US 2023/0036176 A1 Feb. 2, 2023

Related U.S. Application Data

(63) Continuation of application No. PCT/KR2022/008740, filed on Jun. 21, 2022.

(30) Foreign Application Priority Data

Jul. 27, 2021 (KR) ........................ 10-2021-0098685

(51) Int. Cl.
*H04R 1/04* (2006.01)
*H04R 7/00* (2006.01)

(52) U.S. Cl.
CPC ................. *H04R 1/04* (2013.01); *H04R 7/00* (2013.01)

(58) Field of Classification Search
None
See application file for complete search history.

(56) References Cited

U.S. PATENT DOCUMENTS 8,494,577 B2 * 7/2013 Shiogama .............. H04R 1/021 455/575.8
8,724,841 B2 5/2014 Bright et al.
9,185,480 B2 11/2015 Howes et al.
9,363,587 B2 6/2016 Weiss et al.
10,212,501 B2 2/2019 Wang et al.
(Continued)

FOREIGN PATENT DOCUMENTS

JP 5252104 B1 7/2013
JP 2017015695 A 1/2017
(Continued)

*Primary Examiner* — Walter F Briney, III
(74) *Attorney, Agent, or Firm* — CANTOR COLBURN LLP

(57) ABSTRACT

The electronic device including the plurality of acoustic ducts according to various example embodiments may include the main body; the PCB disposed on the main body; the microphone including the microphone body connected to the PCB and the diaphragm connected to the microphone body; the main acoustic duct penetrating the main body and configured to connect the space in which the diaphragm is placed to the external space of the electronic device; and the sub acoustic duct penetrating the main body and configured to connect the external space of the electronic device to the main acoustic duct. In addition, various example embodiments are possible.

20 Claims, 12 Drawing Sheets

(56) References Cited

U.S. PATENT DOCUMENTS

| | | | | |
|---|---|---|---|---|
| 2014/0169585 | A1* | 6/2014 | Howes | H04R 1/086 381/91 |
| 2015/0172797 | A1 | 6/2015 | Murayama | |
| 2017/0164084 | A1* | 6/2017 | Vitt | H04R 1/08 |
| 2018/0279028 | A1 | 9/2018 | Mittleman et al. | |
| 2022/0286539 | A1* | 9/2022 | Stobbe | H04M 1/035 |

FOREIGN PATENT DOCUMENTS

| | | | |
|---|---|---|---|
| JP | 6179297 | B2 | 8/2017 |
| KR | 1020150092579 | A | 8/2015 |
| KR | 1020180033056 | A | 4/2018 |
| KR | 1020190086899 | A | 7/2019 |

* cited by examiner

ELECTRONIC DEVICE HAVING PLURALITY OF ACOUSTIC DUCTS

CROSS-REFERENCE TO RELATED APPLICATIONS

This application is a PCT-Bypass Continuation application of International Application No. PCT/KR2022/008740 designating the United States, filed on Jun. 21, 2022, in the Korean Intellectual Property Receiving Office, which claims priority to Korean Patent Application No. 10-2021-0098685, filed on Jul. 27, 2021, in the Korean Intellectual Property Office, and all the benefits accruing therefrom under 35 U.S.C. § 119, the disclosures of which are incorporated by reference herein in their entireties.

BACKGROUND

1. Field

The disclosure relates to an electronic device including a plurality of acoustic ducts.

2. Description of Related Art

A microphone may be disposed on a printed circuit board (PCB). The microphone may include a diaphragm, which may vibrate by vibration delivered from outside the microphone. An electronic device may include a housing configuring an exterior of the electronic device, a main body provided inside the housing and supporting a PCB, and an acoustic duct penetrating the housing and/or the main body and configured to connect a region near a diaphragm with the outside. Through the acoustic duct, sound may cause a change in a diaphragm of a microphone provided inside the electronic device. For example, the diaphragm of the microphone may receive an acoustic signal from the outside through the acoustic duct.

SUMMARY

When strong pressure is delivered from the outside an electronic device, to a diaphragm of a microphone through an acoustic duct, the diaphragm may collide with a fixed back plate of an electronic device by being pushed back by air pressure generated by the strong pressure. Large stress may be applied to a portion in which the diaphragm and the back plate collide with each other. In case the stress exceeds a threshold, the diaphragm and/or the back plate may be damaged.

Example embodiments of the disclosure may provide an electronic device that may prevent (or effectively reduce) damage to the diaphragm and/or the back plate from by reducing an intensity of the pressure applied to the diaphragm and/or the back plate.

According to various example embodiments, the electronic device 300 including a plurality of acoustic ducts, may include the main body 320, the printed circuit board (PCB) 321 disposed on the main body, the microphone 322 including the microphone body 3221 connected to the PCB 321, the diaphragm 3222 connected to the microphone body, and the back plate 3223 connected to the microphone body and spaced apart from the diaphragm, the front cover 302 connected to the main body, the back cover 311 connected to the main body and provided at an opposite side to the front cover based on the main body, the main acoustic duct 325 penetrating the main body and configured to connect a space in which the diaphragm is placed and an external space of the electronic device (e.g., outside of the electronic device), the side cover 318 connected to the main body and including the main plate hole connecting with the main acoustic duct, and the sub-acoustic duct 326 penetrating the main body and configured to connect the external space of the electronic device to the main acoustic duct.

According to various example embodiments, the electronic device 300 including the plurality of acoustic ducts may include the main body 320, the PCB 321 disposed on the main body, the microphone 322 including the microphone body 3221 connected to the PCB, and the diaphragm 3222 connected to the microphone body, the main acoustic duct 325 penetrating the main body and configured to connect the space in which the diaphragm is placed to the external space of the electronic device, and the sub-acoustic duct 326 penetrating the main body and configured to connect the external space of the electronic device to the main acoustic duct.

According to various example embodiments, the electronic device 300 including the plurality of acoustic ducts may include the main body 320, the PCB 321 disposed on the main body, the microphone 322 including the microphone body 3221 connected to the PCB, the diaphragm 3222 connected to the microphone body, and the back plate 3223 connected to the microphone body and spaced apart from the diaphragm, the front cover 302 connected to the main body, the back cover 311 connected to the main body and provided at an opposite side to the front cover based on the main body, the main acoustic duct 325 penetrating the main body and configured to connect the space in which the diaphragm is placed to the external space of the electronic device, the side cover 318 connected to the main body and including the main plate hole connecting with the main acoustic duct, and the sub-acoustic duct 326 configured to emit a portion of energy entering inside the main acoustic duct from outside before the energy is delivered to the diaphragm.

Through a plurality of acoustic ducts, an electronic device according to various example embodiments may reduce pressure applied to a diaphragm of a microphone and may prevent the diaphragm and/or a back plate from being damaged.

An electronic device, according to various example embodiments, may connect an additional acoustic duct to the outside of the electronic device, by utilizing a space between a back cover and a side cover of a housing, and may not include a separate hole in the housing for connecting the additional acoustic duct to the outside.

An electronic device, according to various example embodiments, may connect an additional acoustic duct to the outside of the electronic device, by utilizing a space between a display and a side cover of a housing, and may not include a separate hole in the housing for connecting the additional acoustic duct to the outside.

In case of an electronic device according to various example embodiments, abnormal pressure applied to any one of acoustic ducts may be emitted to another acoustic duct, and pressure, which does not exceed a threshold, may be applied to a diaphragm of a microphone. Therefore, damage to the diaphragm and/or the back plate is reduced or effectively prevented, by reducing an intensity of the pressure applied to the diaphragm and/or the back plate within the electronic device.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
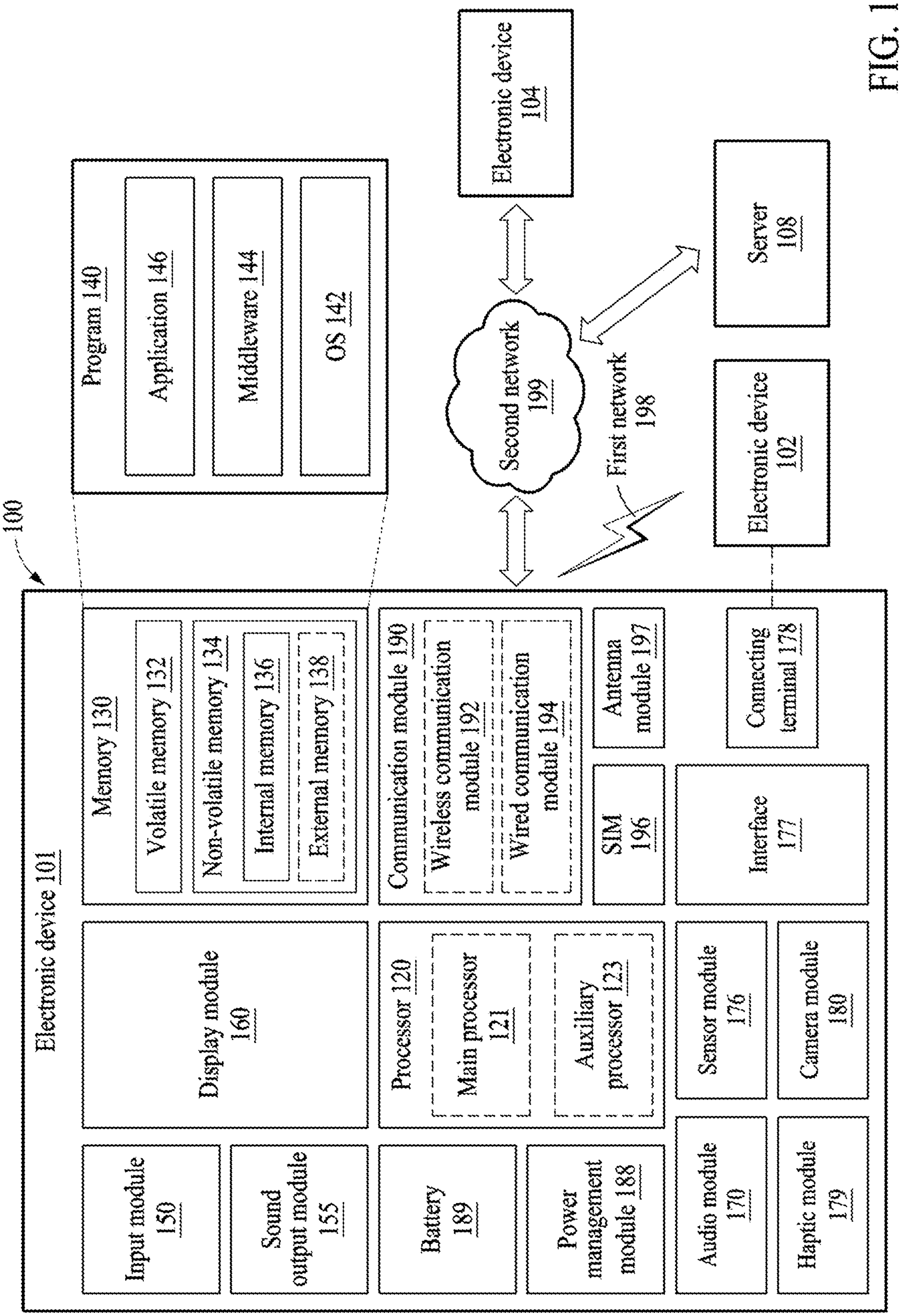
FIG. 1 is a block diagram of an electronic device in a network environment according to an example embodiment.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments.

Referring to FIG. 1, the electronic device 101 in the network environment 100 may connect with an electronic device 102 via a first network 198 (e.g., a short-range wireless communication network), or connect with at least one of an electronic device 104 or a server 108 via a second network 199 (e.g., a long-range wireless communication network). According to an example embodiment, the electronic device 101 may connect with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input device 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and connect signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present. For example, elements which are "directly on" each other, may form an interface with each other, may contact each other, etc.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2A:
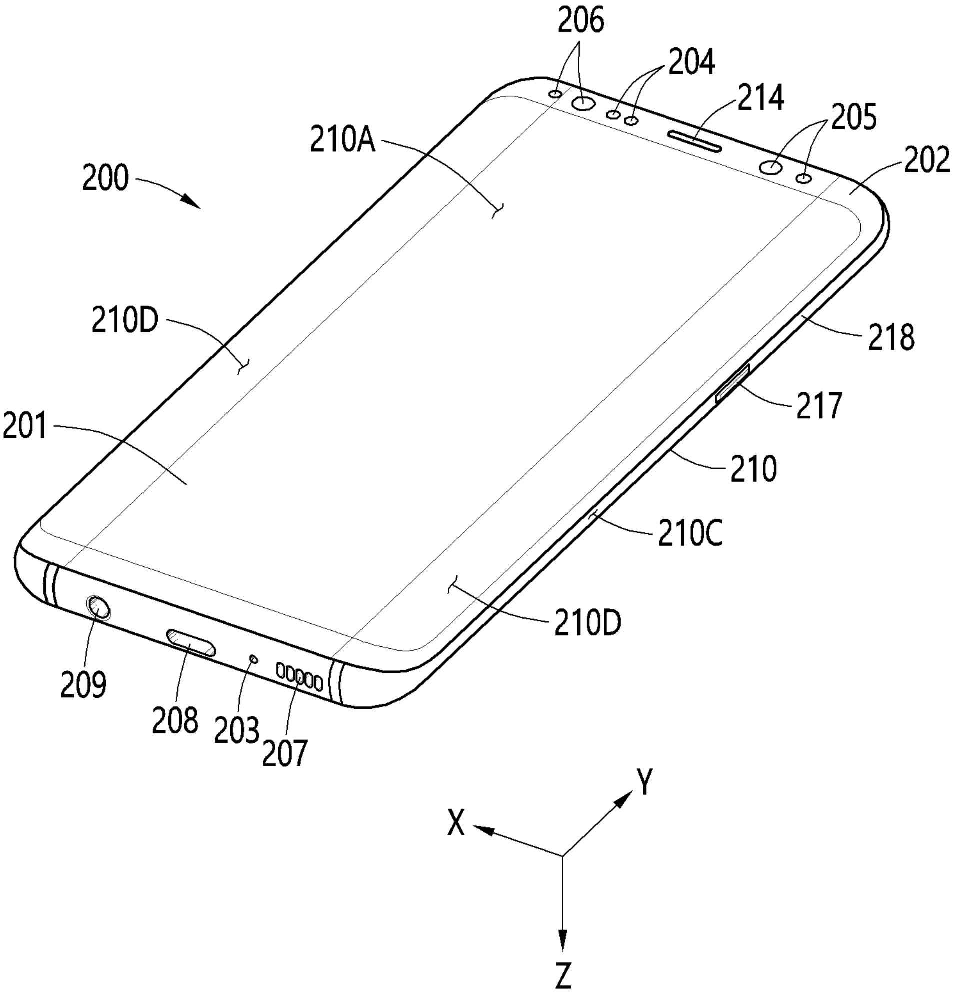
FIG. 2A is a perspective view of a front surface of a mobile electronic device according to an example embodiment.
Figure 2B:
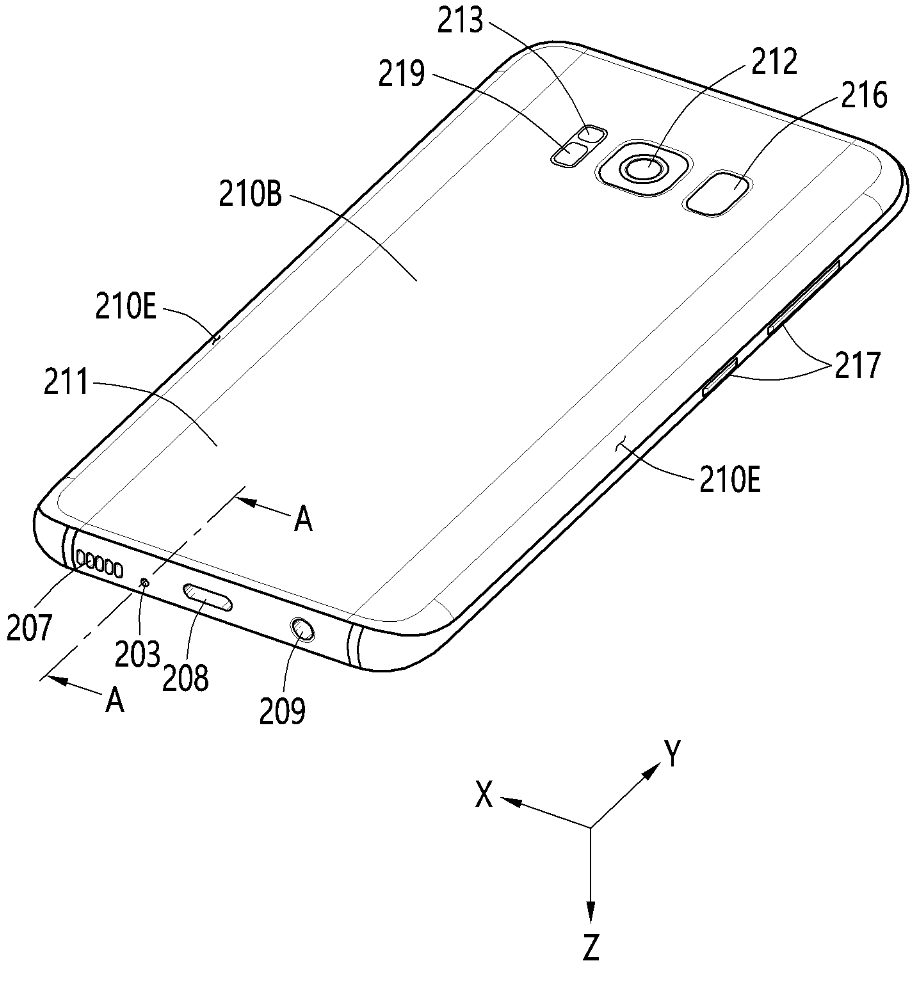
FIG. 2B is a perspective view of a rear surface of the electronic device of FIG. 1 according to an example embodiment.

Referring to FIGS. 1, 2A and 2B, an electronic device 200 according to an example embodiment may include a housing 210 including a first surface (or a front surface) 210A, a second surface (or a rear surface) 210B, and a side surface 210C (e.g., a side portion of the housing) which together surround or define an inner space of the electronic device 200. In another example embodiment (not shown), the housing may also refer to a structure which forms a portion of the first surface 210A, the second surface 210B, and the side surface 210C of FIGS. 2A and 2B. In an example embodiment, the first surface 210A may be formed of (or defined by) a front cover 202 (e.g., a polymer plate or a glass plate including various coating layers) of which at least a portion is substantially transparent. The second surface 210B may be formed of a back cover 211 that is substantially opaque. For example, the back cover 211 may be formed of (or include) coated or colored glass, ceramic, polymer, metal materials (e.g., aluminum, stainless steel (STS), or magnesium) or a combination of at least two of the above materials. The side surface 210C may be coupled to the front cover 202 and the back cover 211 and may be formed by a side cover (or a "side member") 218 including metal and/or polymer. In some example embodiments, the back cover 211 and the side cover 218 may be integrally formed and may include the same material (e.g., a metal material, such as aluminum).

In the illustrated example embodiment, the front cover 202 (e.g., a front portion of the housing) may include two first areas 210D that are curved and extend seamlessly from the first surface 210A and in a direction toward the back cover 211, to define opposing long edges of the front cover 202. In the illustrated example embodiment, the back cover 211 (e.g., a back portion of the housing) may include two second areas 210E that are curved and extend seamlessly from the second surface 210B and in a direction toward the front cover 202, to define opposing long edges of the back cover 211. In some example embodiments, the front cover 202 (or the back cover 211) may include only one of the first areas 210D (or the second areas 210E). In another example embodiment, some of the first areas 210D or the second areas 210E may not be included. In an example embodiment, when viewing a side surface of the electronic device 200, the side cover 218 may have a first thickness (or width) in a thickness direction (e.g., along a Z direction) of the electronic device 200, where the side cover 218 does not include (e.g., excludes) the first areas 210D or the second areas 210E, and may have a second thickness that is less than the first thickness in the thickness direction by including thicknesses of the first areas 210D or the second areas 210E.

According to an example embodiment, the electronic device 200 may include at least one of a display 201, audio modules 203, 207, and 214, sensor modules 204, 216, and 219, camera modules 205, 212, and 213, key input devices 217, a light-emitting element 206, and connector holes 208 and 209. In some example embodiments, the electronic device 200 may not include at least one (e.g., the key input devices 217 or the light-emitting element 206) of the components above, or may additionally include other components.

The display 201 may be exposed (or visible) from outside the electronic device 200, through a substantial portion of the front cover 202, for example. The display 201 may generate and/or display an image, generate and/or emit light used for an image, etc., such that the image may be visible from outside the electronic device 200, through a substantial portion of the front cover 202. In some example embodiments, at least a portion of the display 201 may be exposed through the front cover 202 that forms the first surface 210A and the first areas 210D, such as to define display areas (e.g., portions of a screen display area) of the electronic device 200 at each of the first surface 210A and the first areas 210D. In some example embodiments, an edge of the display 201 may be formed to be substantially the same as an adjacent outer shape of the front cover 202. The edge of the display 201 may be defined in a plan view, e.g., along the Z direction) In another example embodiment (not shown), a distance between an outer edge of the display 201 and an outer edge of the front cover 202 may be substantially the same to expand an exposed area (e.g., a planar area) of the display 201 at which an image is visible.

In another example embodiment (not shown), the electronic device 200 may have a recess or an opening formed (or defined) in a portion of a screen display area of the display 201, and may include at least one of the audio module 214, the sensor module 204, the camera module 205, and the light-emitting element 206 that are aligned with the recess or the opening. In an example embodiment (not shown), at least one of the audio module 214, the sensor module 204, the camera module 205, the sensor module 216 (e.g., a fingerprint sensor), and the light-emitting element 206 may be included on a rear surface of the screen display area of the display 201. In another example embodiment (not shown), the display 201 may be coupled to or disposed adjacent to a touch sensing circuit, a pressure sensor for measuring an intensity (pressure) of a touch, and/or a digitizer for detecting a magnetic-type stylus pen. In some example embodiments, at least some of the sensor modules 204 and 219, and/or at least some of the key input devices 217 may be disposed in the first areas 210D and/or the second areas 210E.

The audio modules 203, 207, and 214 may include a plate hole 203, speaker holes 207 and 214, and a microphone (not shown) provided in the housing 210. The plate hole 203 may be open to outside the electronic device 200 and guide sound from outside of the electronic device 200, to the microphone. The speaker holes 207 and 214 may include an external speaker hole 207 and a receiver hole for a call 214. In some example embodiments, the speaker holes 207 and 214 and the plate hole 203 may be implemented as a single hole, or a speaker (e.g., a piezo speaker) may be included without the speaker holes 207 and 214. The various holes defined herein may be open to outside the electronic device 200, to deliver or guide an audio sound, to and/or from a component within the electronic device 200.

The sensor modules 204, 216, and 219 may generate an electrical signal or a data value corresponding to an internal operational state of the electronic device 200 or an external environmental state (e.g., outside of the electronic device 200). The sensor modules 204, 216, and 219 may include, for example, a first sensor module 204 (e.g., a proximity sensor) and/or a second sensor module (not shown) (e.g., a fingerprint sensor) disposed on the first surface 210A of the housing 210, and/or a third sensor module 219 (e.g., a heart rate monitoring (HRM) sensor) and/or a fourth sensor module 216 (e.g., a fingerprint sensor) disposed on the second surface 210B of the housing 210. The fingerprint sensor may be disposed on both the first surface 210A (e.g., the display 201) and the second surface 210B of the housing 210. The electronic device 200 may further include at least one of sensor modules (not shown), for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illuminance sensor.

The camera modules 205, 212, and 213 may include a first camera device 205 disposed on the first surface 210A of the electronic device 200, a second camera device 212 disposed on the second surface 210B, and/or a flash 213. The camera modules 205 and 212 may each include one or more lenses, an image sensor, and/or an image signal processor. The flash 213 may include, for example, a light-emitting diode (LED) or a xenon lamp. In some example embodiments, two or more lenses (e.g., infrared camera, wide-angle, and telephoto lenses) and image sensors may be disposed on one surface of the electronic device 200.

The key input devices 217 may be disposed on the side surface 210C of the housing 210. In another example embodiment, the electronic device 200 may not include a portion or entirety of the key input devices 217 mentioned above, and the key input device 217 that is not included may be implemented in another form such as a soft key on the display 201. In some example embodiments, the key input devices 217 may include the sensor module 216 disposed on the second surface 210B of the housing 210.

The light-emitting element 206 may be disposed on, for example, the first surface 210A of the housing 210. The light-emitting element 206 may provide, for example, state information of the electronic device 200 in the form of light. In another example embodiment, the light-emitting element 206 may provide, for example, a light source that is linked to the operation of the camera module 205. The light-emitting element 206 may include, for example, an LED, an IR LED, and a xenon lamp.

The connector holes 208 and 209 may include a connector hole 208 for accommodating a connector (e.g., a universal serial bus (USB) connector) for transmitting and receiving power and/or data to and from an external electronic device, and/or a connector hole (e.g., an earphone jack) 209 for accommodating a connector for transmitting and receiving audio signals to and from an external electronic device. The various holes defined herein may be open to outside the electronic device 200, to expose internal components within the electronic device 200 to outside thereof, for connection or interface with a component external to the electronic device 200.

Figure 3:
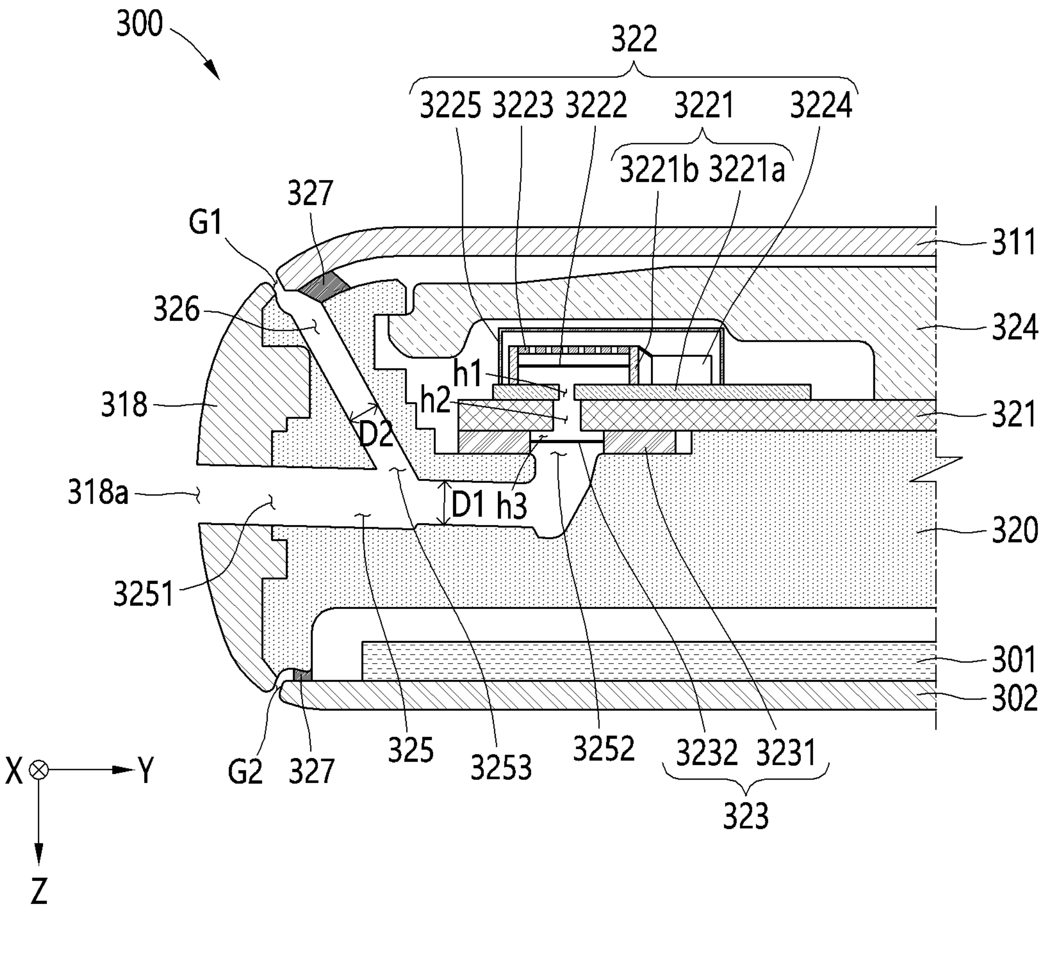
FIG. 3 is a cross-sectional view of an electronic device including a plurality of acoustic ducts according to an example embodiment.

FIG. 3 is a cross-sectional view of an electronic device including a plurality of acoustic ducts according to an example embodiment. FIG. 3 is a cross-sectional view taken along a line A-A of FIG. 2B.

Referring to FIG. 3, an electronic device 300 (e.g., the electronic device 200 of FIG. 2A) including a plurality of acoustic ducts (hereinafter, referred to as the "electronic device") may have a structure that may reduce damage to a microphone by preventing the delivery of excessive external energy to the microphone.

In an example embodiment, for ease of description, a direction (e.g., a +Z direction) in which a display 301 (e.g., the display 201 of FIG. 2) of the electronic device 300 is exposed to outside the electronic device 300 is defined as a front direction, and an opposite direction (e.g., a −Z direction) to the front direction is defined as a rear direction (or, a back direction). The display 301 may be disposed in a plane defined by a first direction and a second direction which cross each other, for example, a Y direction and an X direction.

In an example embodiment, the electronic device 300 may include a main body 320, a front cover 302 enclosing (or extending along) the main body 320 and facing the front direction, a back cover 311 facing the rear direction, a side cover 318, the display 301 connected to the front cover 302, a PCB 321 disposed on a side (e.g., the −Z direction) of the main body 320, a microphone 322 disposed on the PCB 321 (or, electrically connected to the PCB 321), a mesh part 323 disposed on a side (e.g., the −Z direction) of the main body 320 and placed between the main body 320 and the PCB 321, a cover 324 disposed between the main body 320 and the back cover 311 and configured to cover the microphone 322, a main acoustic duct 325 penetrating the main body 320 and open to outside thereof, and a sub-acoustic duct 326 connected to the main acoustic duct 315 and penetrating the main body 320 and open to outside thereof.

In an example embodiment, the main body 320 may support various components of the electronic device 300. For example, the main body 320 may support the PCB 321. The main body 320 may be connected to at least one of the front cover 302, the back cover 311, and/or the side cover 318. For example, the front cover 302 and/or the back cover 311 may be connected to the main body 320 through an adhesive layer 327. For example, an outer side surface of the main body 320 may be provided in a shape corresponding to an inner side surface of the side cover 318. The main body 320 may be placed between the front cover 302 and the back cover 311. In the front direction of the main body 320, for example, in the +Z direction, the front cover 302 may be provided, and in the rear direction of the main body 320, for example, in the −Z direction, the back cover 311 may be provided.

In an example embodiment, the front cover 302 may be provided in the +Z direction of the main body 320. The front cover 302 may support the display 301. In an example embodiment, in case the front cover 302 and the side cover 318 are separate components, for example, in case the front cover 302 and the side cover 318 are not integrally formed as one, a fine gap may be provided between the front cover 302 and the side cover 318. For example, the fine gap may be a gap provided between two different covers when the two covers are assembled. For example, a size of the fine gap may be greater than or equal to about 0.1 millimeter (mm) to less than or equal to 1 mm.

In various example embodiments of the present disclosure, the fine gap provided between the front cover 302 and the side cover 318 is referred to as a front gap G2.

In an example embodiment, the back cover 311 may be provided at an opposite side of the front cover 302, based on the main body 320. The back cover 311 may be provided in the −Z direction of the main body 320. In an example embodiment, in case the back cover 311 and the side cover 318 are separate components, for example, in case the back cover 311 and the side cover 318 are not integrally formed, a fine gap may be provided between the back cover 311 and the side cover 318. In various example embodiments of the present disclosure, the fine gap provided between the back cover 311 and the side cover 318 is referred to as a rear gap G1.

In an example embodiment, the side cover 318 may be placed in a side direction, e.g., an X direction and/or a Y direction of the main body 320. A shape of an inner side surface of the side cover 318 may correspond to a shape of an outer side surface of the main body 320. The side cover 318 may include a main plate hole 318*a* (e.g., the plate hole 203 of FIG. 2A) connecting with the main acoustic duct 325. The main acoustic duct 325 may be open to outside the electronic device 300 at the main plate hole 318*a*. For example, energy generated from the outside (e.g., vibrational energy) may move into the main acoustic duct 325, through the main plate hole 318*a* which is open to the outside and connected to the main acoustic duct 325.

In an example embodiment, the PCB 321 may be disposed on the main body 320. The PCB 321, for example, may be mounted to the main body 320 by an adhesive (not shown).

In an example embodiment, the microphone 322 may be disposed on the PCB 321. Alternatively, the microphone 322 may be electrically connected to the PCB 321 through a connecting member (e.g., a connector, a flexible PCB (FPCB), and a conductive pin). Hereinafter, for ease of description, the description is provided where the microphone 322 is disposed on the PCB 321, however the example embodiments are not limited thereto.

In an example embodiment, the microphone 322 may include a microphone sensor. For example, the microphone sensor may include a micro electromechanical system (MEMS) acoustic transducer. For example, the microphone 322 may include the MEMS acoustic transducer formed by silicon bulk micromachining. The microphone 322 may include a microphone body 3221 connected to the PCB 321, a diaphragm 3222 connected to the microphone body 3221, a back plate 3223 connected to the microphone body 3221 and spaced apart from the diaphragm 3222, a microphone circuit 3224 placed on the microphone body 3221, a microphone housing 3225 connected to the microphone body 3221 and enclosing the diaphragm 3222 together with the back plate 3223 and the microphone circuit 3224. For example, the microphone circuit 3224 may include an ASIC.

In an example embodiment, the back plate 3223 may be provided at a location spaced apart from the diaphragm 3222 in the −Z direction. Although not illustrated in the drawings, the back plate 3223 may be provided at a location spaced apart from the diaphragm 3222 in the +Z direction. The number of back plates 3223 is illustrated as one in the drawings, however, example embodiments are not limited thereto. For example, a plurality of back plates may be provided, and some of the back plates may be provided at locations spaced apart from the diaphragm 3222 in the −Z direction, and the other back plates may be provided at locations spaced apart from the diaphragm 3222 in the +Z direction.

In an example embodiment, the back plate 3223 may include a plurality of penetrating holes. For example, air or a sound wave that flowed into the main acoustic duct 325 from the outside, may be emitted to the outside of the microphone 322 through the plurality of penetrating holes of the back plate 3223.

In an example embodiment, the microphone 322 may convert capacitance, between the back plate 3223 and the diaphragm 3222 which changes as the diaphragm 3222 vibrates due to a sound wave that flowed through a duct (e.g., the main acoustic duct 325), into an electrical signal by the microphone circuit.

In an example embodiment, the microphone body 3221 of the microphone 322 may include a base part 3221*a* flatly disposed on the PCB 321, and a loader 3221*b* which protrudes from the base part 3221*a* toward the −Z direction. The base part 3221*a* may include (or define) a first hole h1 in (or along) the Z direction, at one side of the base part 3221*a*. The one side of the base part 3221*a* may be an end which is closer to the side cover 318, with reference to a center portion of the electronic device 300.

In an example embodiment, the PCB 321 may include a second hole h2 penetrating in the Z direction at one side of the PCB 321 and connecting with the first hole h1. The first hole h1 and the second hole h2 may be aligned with each other, and may together form a single hole. The mesh part 323 may include a third hole h3 penetrating in the +Z direction at one side of the mesh part 323 and connecting with the first hole h1 and the second hole h2. The main acoustic duct 325, the third hole h3, the second hole h2, and the first hole h1 may be provided to sequentially connect with each other and together form a single flow path for energy (e.g., a sound wave, vibrational energy) that flows into the main acoustic duct 325. Vibration entering inside the main acoustic duct 325 from the outside may move along the main acoustic duct 325, and may reach the diaphragm 3222 by sequentially passing through the third hole h3, the second hole h2, and the first hole h1.

In an example embodiment, as pressure applied to the diaphragm 3222 increases, a central portion of the diaphragm 3222 may gradually approach the back plate 3223 in the −Z direction. When the pressure applied to the diaphragm 3222 exceeds a threshold, the diaphragm 3222 may collide with the back plate 3223. In an example embodiment, the electronic device 300 may assist by providing the main acoustic duct 325 as well as the sub-acoustic duct 326 in the main body 320 such that relatively small pressure may apply to a space in which the microphone 322 is placed. A portion of pressure entering the main acoustic duct 325 from the outside may be distributed to the sub-acoustic duct 326. A detailed example embodiment on the main acoustic duct 325 and the sub-acoustic duct 326 is described below.

In an example embodiment, the mesh part 323 may reduce moisture and/or a foreign material inflow into a space between the main body 320 and the back cover 311. The mesh part 323 may include a mesh body 3231 connected to the main body 320, and a mesh plate 3232 supported by the mesh body 3231 and placed between the diaphragm 3222 and the main acoustic duct 325. The mesh plate 3232 may have a mesh structure (e.g., solid portions spaced apart from each other to define openings therebetween). The mesh plate 3232 may filter moisture and/or a foreign material moving from the main acoustic duct 325, to the microphone 322. The mesh plate 3232 may be disposed on (or across) the third hole h3. Although not illustrated in the drawings, the mesh plate 3232 may be integrally formed with the mesh body 3231, and may have a structure including a plurality of holes or openings. For example, the plurality of holes provided on the mesh plate 3232 may be formed by injection molding or a cutting process. The plurality of holes provided in the mesh plate 3232 may connect with the main acoustic duct 325, and may connect with the second hole h2 and the first hole h1.

In an example embodiment, the cover 324 may cover the microphone 322. The cover 324 may be connected to the main body 320. The cover 324 may set a size of a space in which the microphone 322 is placed.

In an example embodiment, the main acoustic duct 325 may penetrate the main body 320. A space in which the diaphragm 3222 is placed may connect with the outside of the electronic device 300 via the main acoustic duct 325. The main acoustic duct 325 may connect with the main plate hole 318*a*. Energy (e.g., a sound wave, vibrational energy) generated from the outside may move to inside the main acoustic duct 325 through the main plate hole 318*a*. A portion of the energy delivered to the inside of the main acoustic duct 325 may be emitted back to the outside through the sub-acoustic duct 326, which is described below. A portion of the energy delivered to the inside of the main acoustic duct 325 and not emitted back to the outside may be delivered to the space in which the diaphragm 3222 is placed.

In an example embodiment, the sub-acoustic duct 326 may penetrate the main body 320. The external space of the electronic device 300 (e.g., an outside environment) may connect with the main acoustic duct 325 via the sub-acoustic duct 326. The sub-acoustic duct 326 may emit a portion of energy entering inside the main acoustic duct 325 from the outside, back to the outside before the energy is delivered to the diaphragm 3222. That is, an acoustic duct which is closer to an outside of the electronic device 300 than the microphone 322, may be open to the outside at a plurality of openings (e.g., an energy input hole and an energy output hole).

In an example embodiment, the main acoustic duct 325 may include an external opening 3251 (e.g., inlet of the main body 320) open toward the main plate hole 318*a*, an internal opening 3252 open toward the diaphragm 3222, and a connection opening 3253 open toward the sub-acoustic duct 326. The connection opening 3253 may be placed between the external opening 3251 and the internal opening 3252. The connection opening 3253 may be placed on (or corresponding to) a region of a central portion of the main acoustic duct 325. A portion of the energy entering inside the main acoustic duct 325 through the external opening 3251 may emit to the outside through the connection opening 3253, and a remainder of the entering energy may be emitted to the space in which the diaphragm 3222 is placed, through the internal opening 3252.

In an example embodiment, the sub-acoustic duct 326 may guide the portion of the energy (e.g., a sound wave or air pressure) entering inside the main acoustic duct 325 through the external opening 3251 to the outside. Even though large pressure is applied to the inside of the main acoustic duct 325, the pressure may be distributed through the sub-acoustic duct 326, and thus, the diaphragm 3222 may be prevented from receiving excessively large pressure.

In an example embodiment, in case pressure of the inside of the main acoustic duct 325 between the external opening 3251 and the connection opening 3253 is first pressure (e.g., first energy pressure), pressure of the inside of the main acoustic duct 325 between the connection opening 3253 and the internal opening 3252 may be second pressure (e.g., second energy pressure), which is less than the first pressure. The portion of energy entering inside the main acoustic duct 325 may be distributed through the connection opening 3253, and thus, the pressure may be reduced while passing through the connection opening 3253.

In an example embodiment, pressure of the space in which the diaphragm 3222 is placed may be less than the pressure of the inside of the main acoustic duct 325 between the external opening 3251 and the connection opening 3253. For example, the pressure of a space between the main body 320 and the back cover 311 may be less than the pressure of the inside of the main acoustic duct 325 between the external opening 3251 and the connection opening 3253.

In an example embodiment, the sub-acoustic duct 326 may be provided in a direction from the main acoustic duct 325 toward the back cover 311. For example, the sub-acoustic duct 326 may be provided in a shape inclined in the −Z direction toward the −Y direction. The sub-acoustic duct 326 may not be covered by the back cover 311 and/or the side cover 318. That is, the sub-acoustic duct 326 may be exposed outside of the back cover 311 and/or the side cover 318. For example, the sub-acoustic duct 326 may define an outlet of the main body 320 and be connected with the rear gap G1 provided between the back cover 311 and the side cover 318. A separate hole to expose the sub-acoustic duct 326 to the outside may not be provided on the back cover 311 or the side cover 318. For example, energy entering the sub-acoustic duct 326 may be emitted to the outside of the electronic device 300 through the rear gap G1. That is, the acoustic duct of the electronic device 300 may be in fluid connection with the rear gap G1.

In cross-section, the acoustic duct may have a dimension (e.g., a diameter, a height, etc.). In an example embodiment, a diameter of the sub-acoustic duct 326 may be less than a diameter of the main acoustic duct 325. For example, the diameters of the main acoustic duct 325 and the sub-acoustic duct 326 may change in the longitudinal direction, respectively. The longitudinal direction may correspond to a direction of the energy flow path. A smallest (or minimum) diameter D1 of the main acoustic duct 325 may be greater than a greatest (or maximum) diameter D2 of the sub-acoustic duct 326. Even if a size of the main body 320 is small, the sub-acoustic duct 326 may be easily provided when the diameter of the sub-acoustic duct 326 is small. It should be noted that in an embodiment, the diameter of the sub-acoustic duct 326 may be greater than the diameter of the main acoustic duct 325.

Figure 4A:
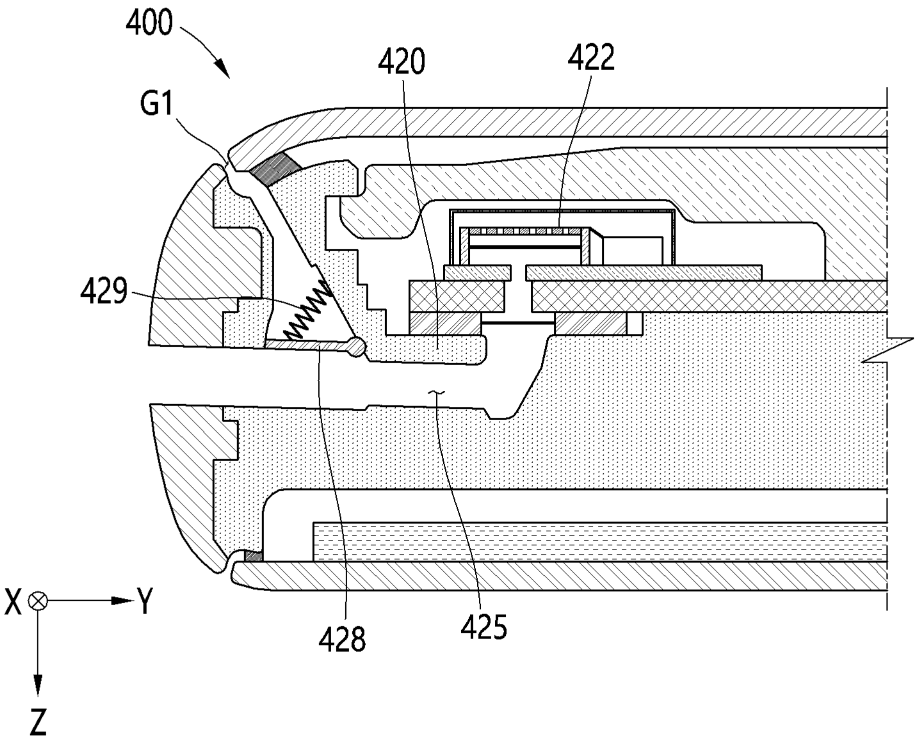
FIG. 4A is a cross-sectional view of an electronic device including a plurality of acoustic ducts with a connection opening closed by a door plate according to an example embodiment.
Figure 4B:
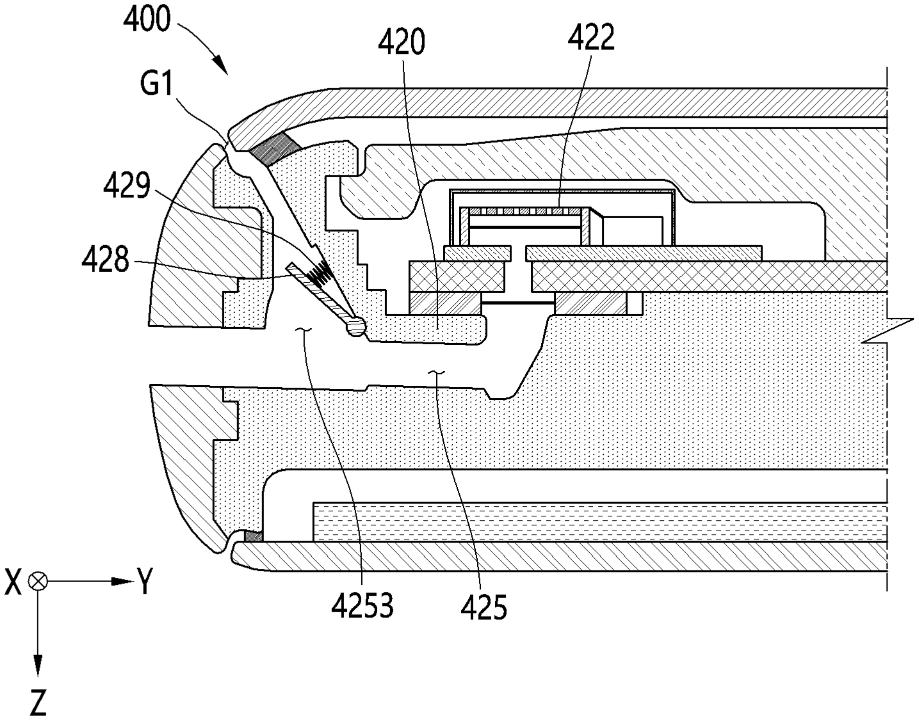
FIG. 4B is a cross-sectional view of the electronic device including the plurality of acoustic ducts with the connection opening open according to an example embodiment.

FIG. 4A is a cross-sectional view of an electronic device including a plurality of acoustic ducts with a connection opening closable by a door plate according to an example embodiment, and FIG. 4B is a cross-sectional view of the electronic device including the plurality of acoustic ducts with a connection opening open according to an example embodiment.

Referring to FIGS. 4A and 4B, an electronic device 400 (e.g., the electronic device 200 of FIG. 2A) may include a door plate 428 rotatably coupled to the main body 420 and configured to open and close a connection opening 4253. For example, the electronic device 400 may include an elastic body 429 of which one end (e.g., a first end) is connected to the main body 420 and the other end (e.g., a second end opposite to the first end) is connected to the door plate 428, to apply elastic force to the door plate 428.

In an example embodiment, when external force (e.g., pressure) equal to or greater than a first intensity is not applied to the elastic body 429 through the door plate 428 (FIG. 4A), the elastic body 429 may be in a maximum tensile state (e.g., maximally extended) while the elastic body 429 is disposed on the electronic device 400. For example, when the external force equal to or greater than the first intensity is not applied to the elastic body 429 through the door plate 428, the door plate 428 may close the connection opening 4253. Here, the elastic body 429 may provide force with a second intensity to the door plate 428 such that the door plate 428 may maintain the connection opening 4253 closed. For example, the first intensity may be an intensity of force that further contracts the elastic body 429, and the second intensity may be a value equal to or less than the first intensity.

In an example embodiment, when pressure increases as a sound wave or air flows into the main acoustic duct 425, pressure transferred through the inside of the main acoustic duct 425 may press the door plate 428 toward the −Z direction (FIG. 4B). When the door plate 428 presses the elastic body 429 by an intensity equal to or greater than the first intensity due to the pressure of the inside of the main acoustic duct 425, the elastic body 429 may be contracted and the door plate 428 may be rotated in a direction that opens the connection opening 4253. As the door plate 428 opens, a portion of the sound wave or air that flowed into the main acoustic duct 425 may be emitted to the outside through the sub-acoustic duct and exit the electronic device 400 through a rear gap G1. Since the portion of the sound wave or the air is emitted to the outside through the rear gap G1, the intensity of pressure of the inside of the main acoustic duct 425 may decrease, and an intensity of the pressure delivered to a microphone 422 may decrease.

In an example embodiment, the electronic device 400 may further include a structure (e.g., stopper) configured to prevent the door plate 428 from opening toward the main acoustic duct 425 (e.g., toward the +Z direction) so as to prevent sound wave or air from flowing into the main acoustic duct 425 through the rear gap G1.

Figure 5:
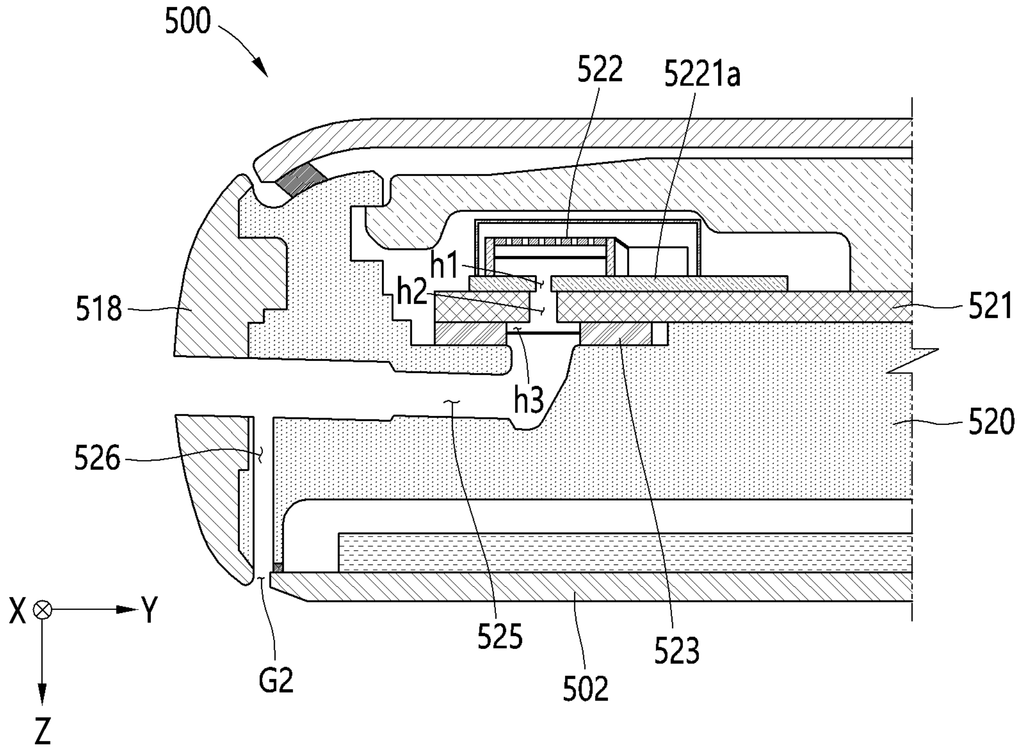
FIG. 5 is a cross-sectional view of an electronic device including a plurality of acoustic ducts according to an example embodiment.

FIG. 5 is a cross-sectional view of an electronic device including a plurality of acoustic ducts according to an example embodiment.

Referring to FIG. 5, in an example embodiment, an electronic device 500 (e.g., the electronic device 200 of FIG. 2A) may include a plurality of acoustic ducts, that is, a main acoustic duct 525 and a sub-acoustic duct 526. The sub-acoustic duct 526 may penetrate a main body 520. The sub-acoustic duct 526 may be provided in a direction from the main acoustic duct 525 toward a front cover 502. The sub-acoustic duct 526 may not be covered by the front cover 502 and/or a side cover 518. For example, the sub-acoustic duct 526 may connect with a front gap G2 placed between the front cover 502 and the side cover 518. A separate hole to expose the sub-acoustic duct 526 to the outside may not be provided in the front cover 502 or the side cover 518.

In an example embodiment, the sub-acoustic duct 526 may include a region of which a diameter increases in a direction from the front gap G2 toward the main acoustic duct 525. For example, a diameter of a region of the sub-acoustic duct 526, adjacent to the front gap G2 at a distal end of the sub-acoustic duct 526, may be less than a diameter of a region of the sub-acoustic duct 526, adjacent to the main acoustic duct 525.

In an example embodiment, a base part 5221*a* may include a first hole h1 penetrating the base part 5221*a* in (or along) the Z direction at one side of the base part. A PCB 521 may include a second hole h2 penetrating the PCB 521 in the Z direction at one side of the PCB 521 and connecting with the first hole h1. The mesh part 523 may include a third hole h3 penetrating in the Z direction on one side of the mesh part 523 and connecting with the first hole h1 and the second hole h2. The main acoustic duct 525 may include the third hole h3, the second hole h2, and the first hole h1 sequentially connecting with each other. A sound wave or air entering inside the main acoustic duct 525 from the outside may move along the main acoustic duct 525 and may reach a microphone 522 by sequentially passing through the third hole h3, the second hole h2, and the first hole h1.

In an example embodiment, a portion of the sound wave or the air entering inside the main acoustic duct 525 may be emitted to the outside through the front gap G2. Since the portion of the sound wave or the air is emitted to the outside through the front gap G2, an intensity of pressure of the inside of the main acoustic duct 525 may decrease and an intensity of pressure delivered to the microphone 522 may decrease.

Figure 6A:
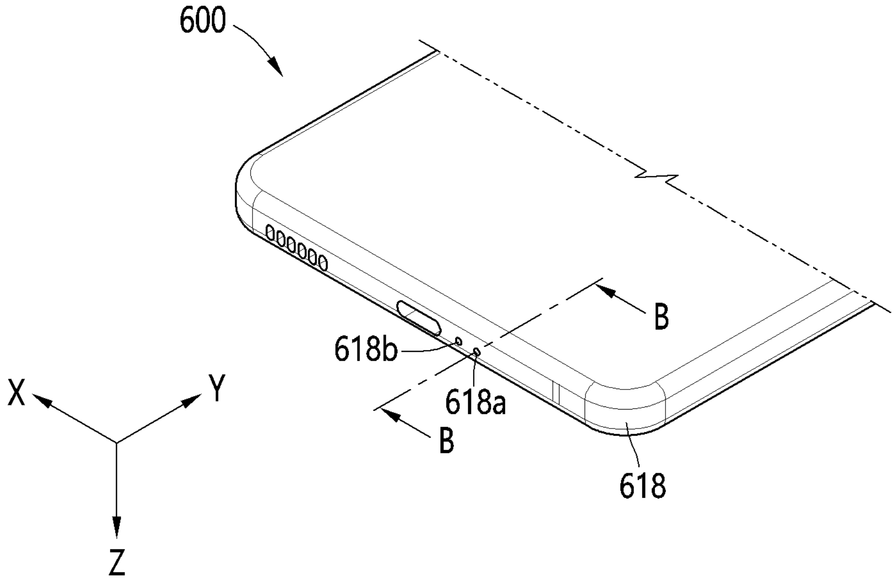
FIG. 6A is a side view of an electronic device including a plurality of acoustic ducts according to an example embodiment.
Figure 6B:
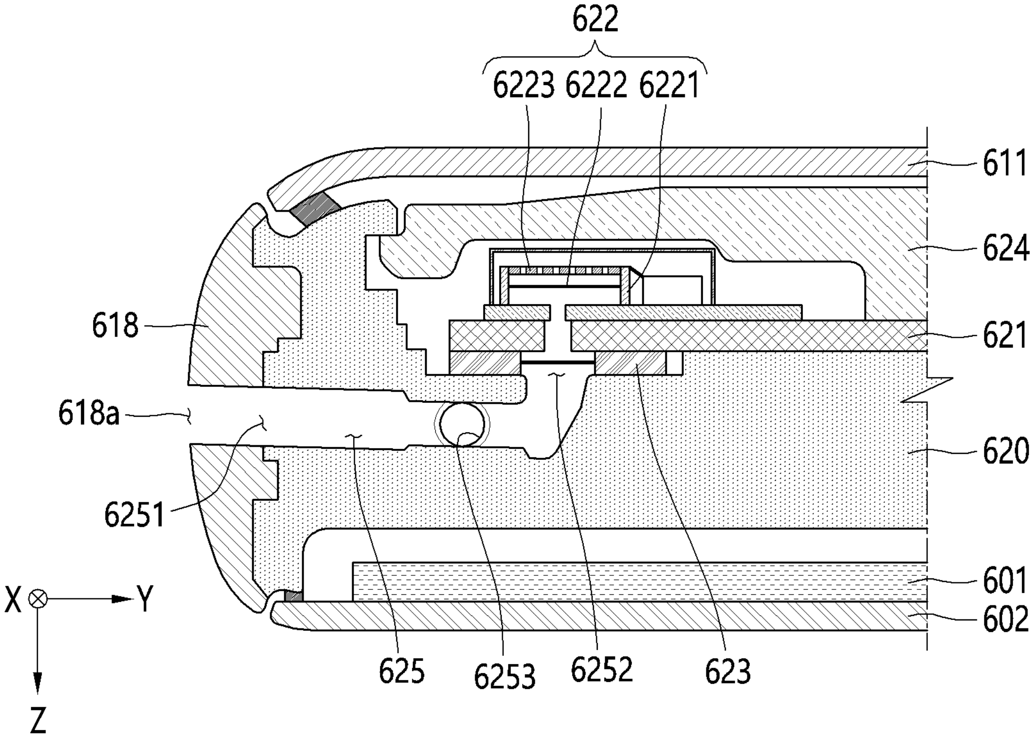
FIG. 6B is a cross-sectional view of the electronic device including the plurality of acoustic ducts according to an example embodiment.
Figure 6C:
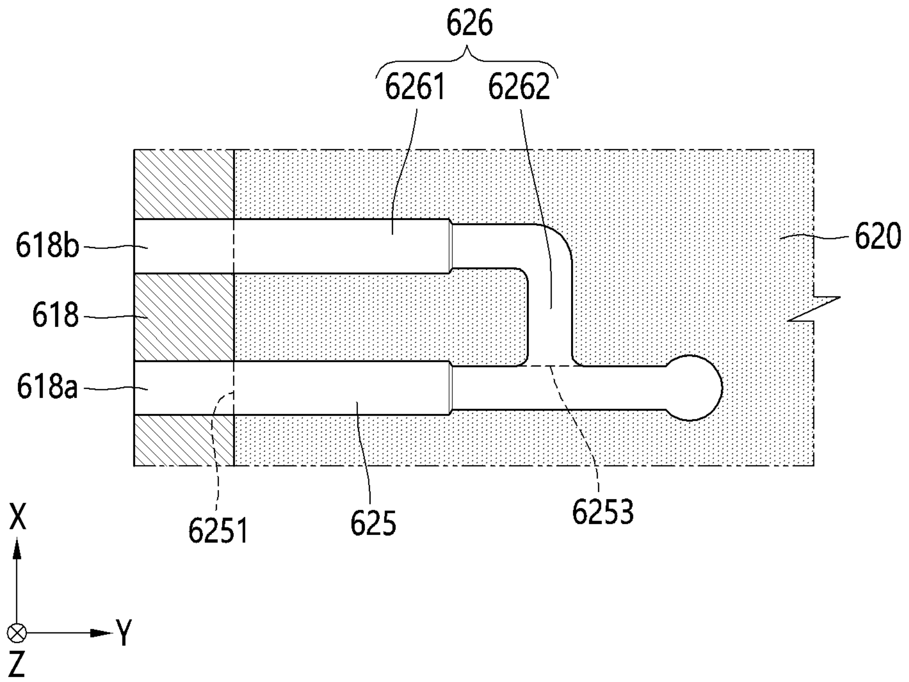
FIG. 6C is a cross-sectional view of the electronic device including the plurality of acoustic ducts from an angle different from FIG. 6B according to an example embodiment.

FIG. 6A is a side view of an electronic device including a plurality of acoustic ducts according to an example embodiment, FIG. 6B is a cross-sectional view of the electronic device including the plurality of acoustic ducts according to an example embodiment, and FIG. 6C is a cross-sectional view of the electronic device including the plurality of acoustic ducts from an angle different from FIG. 6B according to an example embodiment. FIG. 6B is a cross-sectional view taken along a line B-B of FIG. 6A.

Referring to FIGS. 6A to 6C, an electronic device 600 (e.g., the electronic device 200 of FIG. 2A) may include a main body 620, a front cover 602 enclosing the main body 620, a back cover 611, a side cover 618, a display 601 connected to the front cover 602, a PCB 621 disposed on a side of the main body 620, a microphone 622 disposed on the PCB 621, a mesh part 623 disposed on another side of the main body 620 and placed between the main body 620 and the PCB 621, a cover 624 disposed between the main body 620 and the back cover 611 and configured to cover the microphone 622, a main acoustic duct 625 penetrating the main body 620, and a sub-acoustic duct 626 penetrating the main body 620.

The side cover 618 may include a main plate hole 618*a* connecting with the main acoustic duct 625, and a sub plate hole 618*b* connecting with the sub-acoustic duct 626. The main plate hole 618*a* and the sub plate hole 618*b* may be spaced apart from each other in a width direction of the electronic device 600, that is, the X direction. The main plate hole 618*a* and the sub plate hole 618*b* may be defined at a same side of the electronic device 600, and spaced apart from each other along the side cover 618.

In an example embodiment, the microphone 622 may include a microphone body 6221 connected to the PCB 621, a diaphragm 6222 connected to the microphone body 6221, and a back plate 6223 connected to the microphone body 6221 and spaced apart from the diaphragm 6222.

The main body 620 may include an outer side surface closest to and facing the side cover 618. In an example embodiment, the main acoustic duct 625 may include an external opening 6251 open toward the main plate hole 618*a* of the side cover 618, an internal opening 6252 open toward the diaphragm 6222, and a connection opening 6253 open toward the sub-acoustic duct 626. The connection opening 6253 may be placed between the external opening 6251 and the internal opening 6252, along a flow path for energy received from outside the electronic device 600. The external opening 6251 of the main body 620 may be defined at the outer side surface of the main body 620.

In an example embodiment, when excessive pressure applies to inside the main acoustic duct 625, the excessive pressure may be emitted to the outside through the sub-acoustic duct 626 and to outside the electronic device 600 through the sub plate hole 618*b*, before the excessive pressure is delivered to the diaphragm 6222. Thus, a phenomenon of an excessive increase in pressure of a space in which the diaphragm 6222 is placed may be reduced or prevented.

In an example embodiment, the sub-acoustic duct 626 may include a sub duct body 6261 (e.g., duct portion) provided substantially in parallel with the main acoustic duct 625 and a connecting part 6262 (e.g., connection portion or connecting duct) extending from the sub duct body 6261 toward the main acoustic duct 625. The connecting part 6262 may connect the sub duct body 6261 to the main acoustic duct 625. For example, the sub duct body 6261 may have the same or a different size in cross-section, from the main acoustic duct 625.

According to various example embodiments, one skilled in the art will understand that the main acoustic duct 625 and the sub-acoustic duct 626 may have a difference in at least one of a size, a length, and/or a shape from the drawings. For example, the sub-acoustic duct 626 may penetrate the main body 620 in an irregular shape (e.g., a wave shape).

In an example embodiment, when abnormally large pressure applies to the inside of the main acoustic duct 625, a portion of the pressure may be emitted to the outside through the sub-acoustic duct 626 and the sub plate hole 618*b*.

Through the pressure emission, applying abnormally large pressure to a space in which the diaphragm 6222 is placed may be prevented.

Figure 7A:
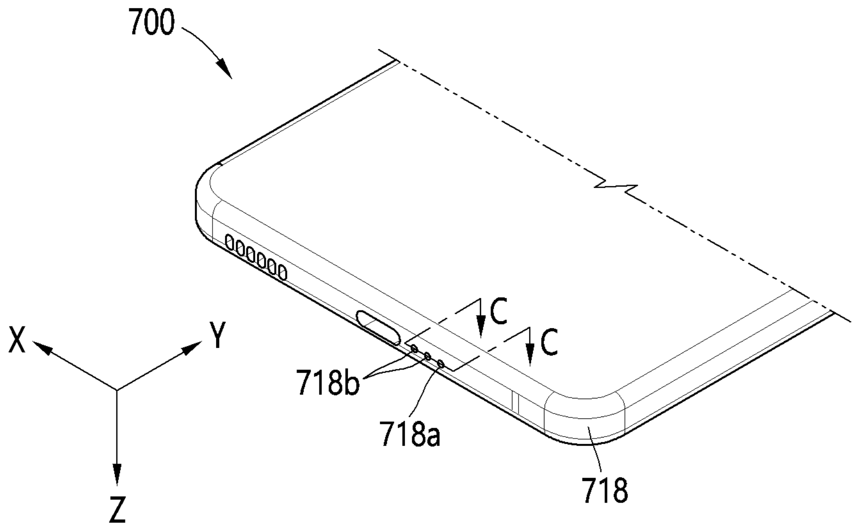
FIG. 7A is a side view of an electronic device including a plurality of acoustic ducts according to an example embodiment.
Figure 7B:
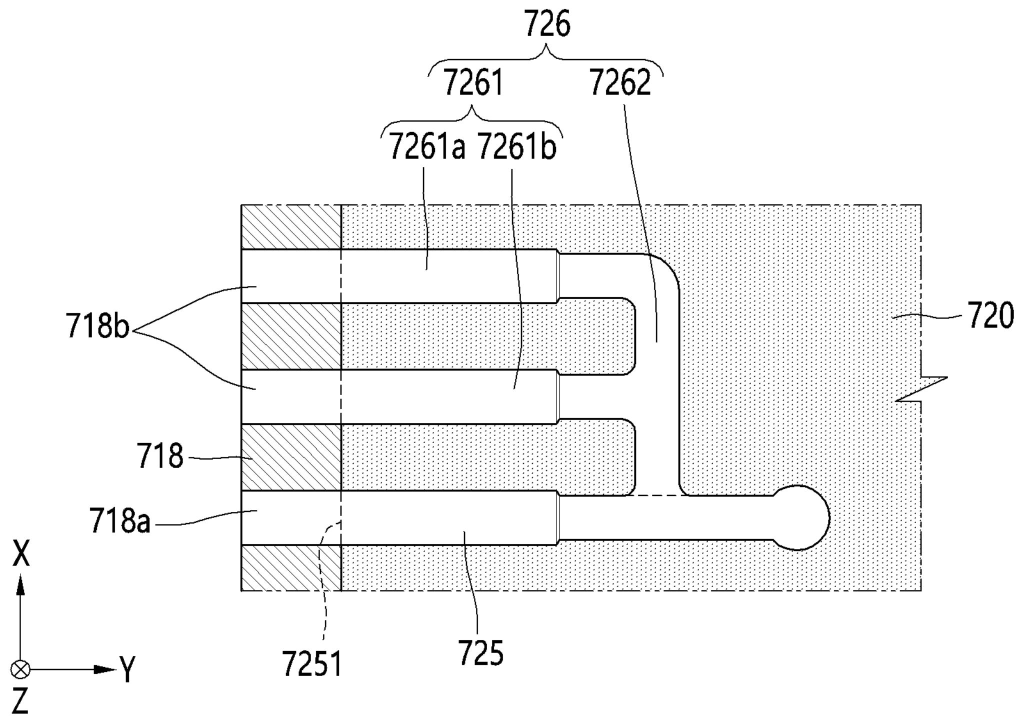
FIG. 7B is a cross-sectional view of the electronic device including the plurality of acoustic ducts according to an example embodiment.

FIG. 7A is a side view of an electronic device including a plurality of acoustic ducts according to an example embodiment, and FIG. 7B is a cross-sectional view of the electronic device including the plurality of acoustic ducts according to an example embodiment. FIG. 7B is a cross-sectional view taken along a line C-C of FIG. 7A.

Referring to FIGS. 7A and 7B, an electronic device 700 (e.g., the electronic device 200 of FIG. 2A) may include a main body 720 and a side cover 718 connected to the main body 720. A main acoustic duct 725 and a sub-acoustic duct 726 may be provided in the main body 720. The main acoustic duct 725 and the sub-acoustic duct 726 may penetrate the main body 720. The side cover 718 may include a main plate hole 718*a* connecting with the main acoustic duct 725, and a sub plate hole 718*b* provided in plural each connecting with the sub-acoustic duct 726.

In an example embodiment, the main acoustic duct 725 may include an external opening 7251 open toward a main plate hole 718*a*, and a connection opening open toward the sub-acoustic duct 726.

In an example embodiment, the sub-acoustic duct 726 may include a plurality of duct bodies 7261 (e.g., a sub-duct provided in plural including a plurality of sub-ducts) each extended substantially in parallel with the main acoustic duct 725, and a connecting part 7262 extending from the plurality of sub duct bodies 7261 toward the main acoustic duct 725. The plurality of sub duct bodies 7261 may connect with the main acoustic duct 725 via the connecting part 7262. The plurality of sub duct bodies 7261 may include a first sub duct body 7261*a* (e.g., a first sub-duct) and a second sub duct body 7261*b* (e.g., a second sub-duct) provided in parallel with each other. In an example embodiment, at least one of the main acoustic duct 725, the first sub duct body 7261*a*, and the second sub duct body 7261*b* may have the same size or a different size from the other, along the plane defined by the X direction and the Y direction crossing each other, and/or along the thickness direction (e.g., the Z direction).

According to various example embodiments, one skilled in the art will understand that the main acoustic duct 725 and the sub-acoustic duct 726 may have a difference in at least one of a size, a length, and/or a shape from the drawings.

The electronic device 300 including the plurality of acoustic ducts according to various example embodiments may include the main body 320, the PCB 321 disposed on the main body, the microphone 322 including the microphone body 3221 connected to the PCB, the diaphragm 3222 connected to the microphone body and the back plate 3223 connected to the microphone body and spaced apart from the diaphragm, the front cover 302 connected to the main body, the back cover 311 connected to the main body and provided at an opposite side to the front cover based on the main body, the main acoustic duct 325 penetrating the main body and configured to connect the space in which the diaphragm is placed to the external space of the electronic device, the side cover 318 connected to the main body and including the main plate hole connecting with the main acoustic duct, and the sub-acoustic duct 326 penetrating the main body and configured to connect the external space of the electronic device to the main acoustic duct.

In various example embodiments, the main acoustic duct 325 may include the external opening 3251 open toward the main plate hole, the internal opening 3252 open toward the diaphragm, and the connection opening 3253 open toward the sub-acoustic duct and placed between the external opening and the internal opening.

In various example embodiments, the sub-acoustic duct 326 may guide a portion of energy entering inside the main acoustic duct through the external duct, to the outside of the electronic device.

In various example embodiments, in case pressure of the inside of the main acoustic duct 325 between the external opening 3251 and the connection opening 3253 is first pressure, pressure of the inside of the main acoustic duct 325 between the connection opening 3253 and the internal opening 3252 may be second pressure, which is less than the first pressure.

In various example embodiments, the pressure of the space in which the diaphragm 3222 is placed may be equal to or less than the pressure of the inside the main acoustic duct 325 between the external opening and the connection opening.

In various example embodiments, the electronic device 400 may further include the door plate 428 which is rotatable as being rotatably coupled to the main body and configured to open and close the connection opening.

In various example embodiments, the sub-acoustic duct 326 may be provided in the direction from the main acoustic duct 325 toward the back cover 311.

In various example embodiments, the sub-acoustic duct 326 may connect with the rear gap G1 provided between the back cover 311 and the side cover 318.

In various example embodiments, the sub-acoustic duct 526 may be provided in the direction from the main acoustic duct 525 toward the front cover 502.

In various example embodiments, the sub-acoustic duct 526 may connect with the front gap G2 provided between the front cover and the side cover.

In various example embodiments, the sub-acoustic duct 626 may include the sub duct body 6261 provided in parallel with the main acoustic duct, and the connecting part 6262 extending from the sub duct body toward the main acoustic duct and configured to connect the sub duct body to the main acoustic duct.

In various example embodiments, the side cover 618 may further include the sub plate hole 618*b* connecting with the sub duct body.

In various example embodiments, the plurality of sub duct bodies 7261 may connect with the main acoustic duct 725 via the connecting part 7262.

In various example embodiments, the diameter D2 (e.g., maximum diameter) of the sub-acoustic duct 326 may be less than the diameter D1 (e.g., minimum diameter) of the main acoustic duct 325.

In various example embodiments, the electronic device 300 may further include the mesh plate 3232 disposed on the main body 320 and placed between the diaphragm and the main acoustic duct.

The electronic device 300 including the plurality of acoustic ducts according to various example embodiments may include the main body 320, the PCB 321 disposed on the main body, the microphone 322 including the microphone body 3221 connected to the PCB and the diaphragm 3222 connected to the microphone body, the main acoustic duct 325 penetrating the main body and configured to connect the space in which the diaphragm is placed to the external space of the electronic device, and the sub-acoustic duct 326 penetrating the main body and configured to connect the external space of the electronic device to the main acoustic duct.

In various example embodiments, the main acoustic duct 325 may include the external opening 3251 open toward the outside the electronic device, the internal opening 3252 open toward the diaphragm, and the connection opening 3253 open toward the sub-acoustic duct and placed between the external opening and the internal opening.

In various example embodiments, the sub-acoustic duct 326 may guide a portion of energy entering inside the main acoustic duct through the external duct to the outside.

In various example embodiments, the pressure of the space in which the diaphragm 3222 is placed may be equal to or less than the pressure of the inside the main acoustic duct 325 between the external opening and the connection opening.

According to various example embodiments, the electronic device 300 including the plurality of acoustic ducts may include the main body 320, the PCB 321 disposed on the main body, the microphone 322 including the microphone body 3221 connected to the PCB, the diaphragm 3222 connected to the microphone body and the back plate 3223 connected to the microphone body and spaced apart from the diaphragm, the front cover 302 connected to the main body, the back cover 311 connected to the main body and provided at an opposite side to the front cover based on the main body, the main acoustic duct 325 penetrating the main body and configured to connect the space in which the diaphragm is placed to the external space of the electronic device, the side cover 318 connected to the main body and including the main plate hole connecting with the main acoustic duct, and the sub-acoustic duct 326 configured to emit a portion of energy entering inside the main acoustic duct from the outside before the energy is delivered to the diaphragm.

What is claimed is:

1. An electronic device comprising:

a main body;

a printed circuit board disposed on the main body;

a microphone comprising a microphone body connected to the printed circuit board, a diaphragm connected to the microphone body, and a back plate connected to the microphone body and spaced apart from the diaphragm;

a front cover connected to the main body;

a back cover connected to the main body and provided at an opposite side to the front cover based on the main body;

a main acoustic duct penetrating the main body and configured to connect a space in which the diaphragm is placed to an external space of the electronic device;

a side cover connected to the main body and comprising a main plate hole connecting with the main acoustic duct; and a sub-acoustic duct penetrating the main body and configured to directly connect the external space of the electronic device to the main acoustic duct.

2. The electronic device of claim 1, wherein the main acoustic duct comprises an external opening open toward the main plate hole, an internal opening open toward the diaphragm, and a connection opening open toward the sub-acoustic duct and placed between the external opening and the internal opening.

3. The electronic device of claim 2, wherein the sub-acoustic duct guides to the outside a portion of energy entering inside the main acoustic duct through the external opening.

4. The electronic device of claim 2, wherein within the main acoustic duct of the main body:

a first energy pressure is defined between the external opening and the connection opening, a second energy pressure is defined between the connection opening and the internal opening, and the second pressure is less than the first pressure.

5. The electronic device of claim 2, wherein a first pressure is defined at the space of the microphone in which the diaphragm is disposed, a second pressure is defined within the main acoustic duct of the main body, between the external opening and the connection opening, and the first pressure is less than the second pressure.

6. The electronic device of claim 2, further comprising within the main body:

a door plate rotatably coupled to the main body at the connection opening and configured to open and close the connection opening.

7. The electronic device of claim 1, wherein the sub-acoustic duct is provided in a direction from the main acoustic duct toward the back cover.

8. The electronic device of claim 7, wherein the sub-acoustic duct connects with a rear gap provided between the back cover and the side cover.

9. The electronic device of claim 1, wherein the sub-acoustic duct is provided in a direction from the main acoustic duct toward the front cover.

10. The electronic device of claim 9, wherein the sub-acoustic duct connects with a front gap provided between the front cover and the side cover.

11. The electronic device of claim 1, wherein the sub-acoustic duct comprises:

a sub duct body provided in parallel with the main acoustic duct; and a connecting part extending from the sub duct body toward the main acoustic duct and configured to connect the sub duct body to the main acoustic duct.

12. The electronic device of claim 11, wherein the side cover comprises a sub plate hole connecting with the sub duct body.

13. The electronic device of claim 11, wherein a plurality of sub duct bodies is provided, and the connecting part connects the plurality of sub duct bodies to the main acoustic duct.

14. The electronic device of claim 1, wherein a diameter of the sub-acoustic duct is less than a diameter of the main acoustic duct.

15. The electronic device of claim 1, further comprising:

a mesh plate disposed on the main body and placed between the diaphragm and the main acoustic duct.

16. An electronic device comprising:

a main body;

a printed circuit board disposed on the main body;

a microphone comprising a microphone body connected to the printed circuit board, and a diaphragm connected to the microphone body;

a main acoustic duct penetrating the main body and configured to connect a space in which the diaphragm is placed to an external space of the electronic device; and a sub-acoustic duct penetrating the main body and configured to directly connect the external space of the electronic device to the main acoustic duct.

17. The electronic device of claim 16, wherein the main acoustic duct comprises an external opening open toward the outside of the electronic device, an internal opening open toward the diaphragm, and a connection opening open toward the sub-acoustic duct and placed between the external opening and the internal opening.

18. The electronic device of claim 17, wherein within the main body, the sub-acoustic duct guides a portion of the energy from the main acoustic duct, to outside the main body.

19. The electronic device of claim 17, wherein a first pressure is defined within the microphone, at the diaphragm of the microphone, a second pressure is defined within the main acoustic duct of the main body, between the external opening and the connection opening, and the first pressure is less than the second pressure.

20. An electronic device comprising:

a main body;

a printed circuit board disposed on the main body;

a microphone comprising a microphone body connected to the printed circuit board, a diaphragm connected to the microphone body, and a back plate connected to the microphone body and spaced apart from the diaphragm;

a front cover connected to the main body;

a back cover connected to the main body and provided at an opposite side to the front cover based on the main body;

a main acoustic duct penetrating the main body and configured to connect a space in which the diaphragm is placed to an external space of the electronic device;

a side cover connected to the main body and comprising a main plate hole connecting with the main acoustic duct; and a sub-acoustic duct configured to emit a portion of energy entering inside the main acoustic duct from outside before the energy is delivered to the diaphragm, the sub-acoustic duct penetrating the main body to directly connect the external space of the electronic device to the main acoustic duct.

* * * * *